United States Patent
Tamamura et al.

(10) Patent No.: US 9,260,336 B2
(45) Date of Patent: Feb. 16, 2016

(54) METHOD FOR MANUFACTURING BAND-SHAPED GLASS

(71) Applicant: Nippon Electric Glass Co., Ltd., Shiga (JP)

(72) Inventors: Shusaku Tamamura, Shiga (JP); Takahide Nakamura, Shiga (JP); Katsutoshi Fujiwara, Shiga (JP)

(73) Assignee: NIPPON ELECTRIC GLASS CO., LTD., Shiga (JP)

( * ) Notice: Subject to any disclaimer, the term of this patent is extended or adjusted under 35 U.S.C. 154(b) by 111 days.

(21) Appl. No.: 14/131,257

(22) PCT Filed: Dec. 17, 2012

(86) PCT No.: PCT/JP2012/082666
§ 371 (c)(1),
(2) Date: Jan. 7, 2014

(87) PCT Pub. No.: WO2013/099676
PCT Pub. Date: Jul. 4, 2013

(65) Prior Publication Data
US 2014/0137602 A1    May 22, 2014

(30) Foreign Application Priority Data

Dec. 26, 2011 (JP) ................................ 2011-283380

(51) Int. Cl.
*C03C 17/06* (2006.01)
*C03B 17/06* (2006.01)
(Continued)

(52) U.S. Cl.
CPC .............. *C03B 17/065* (2013.01); *C03B 17/06* (2013.01); *C03B 17/064* (2013.01); *C03B 17/067* (2013.01); *C03B 33/0235* (2013.01); *C03B 33/091* (2013.01); *C03B 35/166* (2013.01)

(58) Field of Classification Search
CPC ........................................................ C03B 17/065
USPC ............................................................... 65/94
See application file for complete search history.

(56) References Cited

U.S. PATENT DOCUMENTS 6,502,423 B1    1/2003  Ostendarp et al.
8,925,352 B2 *  1/2015  Boisselle .............. C03B 23/033
                                                    65/106
(Continued)

FOREIGN PATENT DOCUMENTS

EP    2548852        1/2013
JP    2000-335928   12/2000
(Continued)

OTHER PUBLICATIONS

International Preliminary Report on Patentability and Written Opinion of the International Searching Authority issued Jul. 10, 2014 in International (PCT) Application No. PCT/JP2012/082666.
(Continued)

*Primary Examiner* — Erin Snelting
(74) *Attorney, Agent, or Firm* — Wenderoth, Lind & Ponack, L.L.P.

(57) ABSTRACT

A method of manufacturing a band-shaped glass includes forming, while being drawn downward, the band-shaped glass having a thickness of 300 μm or less except both edge portions in a width direction thereof, and then changing a conveying direction of the band-shaped glass to a lateral direction so that a front surface constitutes an upper surface. The band-shaped glass is introduced to a region for changing the conveying direction under a curved state in which the front surface side thereof is concave in the width direction. The band-shaped glass in the curved state satisfies a relationship of $0 > \delta \geq -200$ mm, where $\delta$ represents a maximum separation distance with respect to an imaginary straight line connecting both the edge portions of the band-shaped glass in the width direction, provided that the maximum separation distance is positive on the front surface side of the band-shaped glass.

6 Claims, 4 Drawing Sheets

(51) Int. Cl.
*C03B 35/16* (2006.01)
*C03B 33/023* (2006.01)
*C03B 33/09* (2006.01)

(56) References Cited

U.S. PATENT DOCUMENTS

| | | |
|---|---|---|
| 2003/0029199 A1 | 2/2003 | Pitbladdo |
| 2005/0092027 A1 | 5/2005 | Pitbladdo |
| 2007/0056323 A1 | 3/2007 | Pitbladdo |
| 2008/0131651 A1 | 6/2008 | Burdette et al. |
| 2010/0126226 A1* | 5/2010 | Zhou et al. ............ 65/158 |
| 2011/0094267 A1* | 4/2011 | Aniolek ............ C03B 17/064 65/91 |
| 2011/0197634 A1 | 8/2011 | Eta |
| 2011/0223386 A1 | 9/2011 | Tomamoto et al. |
| 2012/0024928 A1 | 2/2012 | Matsumoto et al. |
| 2012/0024929 A1 | 2/2012 | Teranishi et al. |
| 2012/0260695 A1 | 10/2012 | Pitbladdo |

FOREIGN PATENT DOCUMENTS

| | | |
|---|---|---|
| WO | 2011/102175 | 8/2011 |
| WO | 2012/011439 | 1/2012 |

OTHER PUBLICATIONS

International Search Report issued Jan. 29, 2013 in International (PCT) Application No. PCT/JP2012/082666.
Extended European Search Report issued Jul. 27, 2015 in corresponding European Application No. 12861340.3.

* cited by examiner

METHOD FOR MANUFACTURING BAND-SHAPED GLASS

BACKGROUND OF INVENTION

1. Technical Field

The present invention relates to an improved technology for a method of manufacturing a band-shaped glass, which involves forming a band-shaped glass while being drawn downward by, for example, an overflow downdraw method, followed by changing a conveying direction of the band-shaped glass to a lateral direction.

2. Background Art

In recent years, flat panel displays as typified by a liquid crystal display, a plasma display, an OLED display, and a field emission display have become widespread in place of CRT displays, which have conventionally been widespread, from the viewpoint of achieving space saving and the like.

There has been a demand that the OLED display, among other displays, be folded or rolled to facilitate its carriage, and be usable even in a shape conforming to a curved surface as well as a flat surface.

To meet this demand, a resin film may be applied as a substrate of the OLED display in consideration of high flexibility thereof. However, the light emitting element to be used in the OLED display is degraded when being exposed to gas such as oxygen and water vapor, and hence it is preferred from this viewpoint that a glass substrate having higher gas barrier property than the resin film be applied as the substrate of the OLED display.

However, the glass to be used in the substrate is vulnerable to tensile stress and thus low in flexibility unlike the resin film. Therefore, when the tensile stress is applied to the surface of the glass substrate due to bending of the glass substrate, the glass substrate may be damaged. Thus, there is a demand for higher flexibility of the glass substrate to be used in the OLED display.

Further, when solar cells and OLED lighting devices as well as displays can be mounted on the surface of an object including a curved surface, such as a body surface of an automobile and a roof, post, and exterior wall of a building, the range of uses of those devices is widened. Thus, there is a demand for higher flexibility of even a glass substrate and a cover glass to be used in those devices.

In addition, there is a demand from the market for further thinning of those devices such as displays, solar cells, and OLED lighting devices. Along with this, there is a demand for thinning of even a glass substrate and the like to be used in those devices.

To meet those demands for thinning and higher flexibility of the glass sheet, the use of a film-shaped glass having a thickness of 300 μm or less is proposed. Such a film-shaped glass is obtained by cutting a band-shaped glass into a predetermined length.

Such a band-shaped glass can be manufactured successively through use of, for example, an overflow downdraw method. In this case, as disclosed in, for example, Patent Literature 1, the band-shaped glass is formed while being drawn downward, and then the conveying direction of the band-shaped glass is changed to the lateral direction. With this operation, the subsequent processes for the band-shaped glass are facilitated.

CITATION LIST

Patent Literature 1: JP 2000-335928 A

TECHNICAL PROBLEM

However, when this manufacturing method is employed, the band-shaped glass is thin, and hence, due to external factors such as an ascending airflow, the band-shaped glass that is being drawn downward may be curved on the front surface side or the back surface side, and the curving direction may further be changed in a short period. When the posture of the band-shaped glass that is being drawn downward is thus unstable, the posture of the band-shaped glass that is being introduced to a region for changing the direction is not even constant. Due to the posture at this time, stress concentration occurs in the band-shaped glass, with the result that the band-shaped glass may be damaged. Note that, in the manufacture of the band-shaped glass having a thickness of 300 μm or less, the glass is extremely thin, and hence the damage to the glass is an inevitable problem.

Further, when the band-shaped glass is damaged during the manufacture, a considerable period of time is required to restore the manufacturing line to the original state again. Therefore, the damage to the band-shaped glass is a factor in significant degradation of the productivity of the band-shaped glass.

SUMMARY OF INVENTION

The present invention has been made in view of the above-mentioned circumstances, and it is therefore a technical object thereof to suppress damage to a band-shaped glass in a method of manufacturing a band-shaped glass, which involves changing, to a lateral direction, a conveying direction of the band-shaped glass that is formed while being drawn downward.

Solution to Problem

In order to achieve the above-mentioned object, according to one embodiment of the present invention, there is provided a method of manufacturing a band-shaped glass, comprising: forming, while being drawn downward, a band-shaped glass having a thickness of 300 μm or less except both edge portions in a width direction thereof; and then changing a conveying direction of the band-shaped glass to a lateral direction so that a front surface of both surfaces of the band-shaped glass constitutes an upper surface, the band-shaped glass being introduced to a region for changing the conveying direction under a curved state in which the front surface side thereof is concave in the width direction, the band-shaped glass in the curved state satisfying a relationship of $0 > \delta \geq -200$ mm, where $\delta$ represents a maximum separation distance with respect to an imaginary straight line connecting both the edge portions of the band-shaped glass in the width direction, provided that the maximum separation distance is positive on the front surface side of the band-shaped glass.

With this structure, the band-shaped glass is introduced to the region for changing the conveying direction under the curved state in which the front surface side thereof is concave in the width direction while satisfying the relationship of $0 > \delta \geq -200$ mm. That is, when the band-shaped glass is to be introduced to the region for changing the conveying direction, the band-shaped glass is intendedly brought into the curved shape in which the front surface side thereof is concave in the width direction. Therefore, the band-shaped glass is brought into a stable state, and has an appropriate curvature. Thus, during the change in direction, application of unreasonable stress to the band-shaped glass is suppressed, and hence the band-shaped glass can be bent easily for the change in direction. Accordingly, the damage to the band-shaped glass can be suppressed.

In the above-mentioned structure, it is preferred that the band-shaped glass in the curved state satisfy a relationship of $0 > \delta \geq -100$ mm.

With this structure, the band-shaped glass can be bent easily for the change in direction with higher reliability. Thus, the effect of suppressing the damage to the band-shaped glass becomes remarkable.

In the above-mentioned structure, it is preferred that the band-shaped glass in the curved state satisfy a relationship of $0 > \delta \geq -50$ mm.

With this structure, the band-shaped glass can be bent easily for the change in direction with higher reliability. Thus, the effect of suppressing the damage to the band-shaped glass becomes remarkable. Further, as the nature of the band-shaped glass, the warp of the band-shaped glass is reduced, and hence the quality of the band-shaped glass can be enhanced.

In any one of the above-mentioned structures, it is preferred that, during the forming of the band-shaped glass, a temperature difference be imparted between the front surface and the back surface of the band-shaped glass to bring the band-shaped glass into the curved state.

With this structure, the band-shaped glass can easily be brought into the curved state.

Advantageous Effects of Invention

As described above, according to one embodiment of the present invention, the band-shaped glass can be bent easily for the change in direction. Accordingly, the damage to the band-shaped glass can be suppressed in the method of manufacturing a band-shaped glass, which involves changing, to the lateral direction, the conveying direction of the band-shaped glass that is formed while being drawn downward.

DESCRIPTION OF EMBODIMENTS

Now, an embodiment of the present invention is described with reference to the drawings.

Figure 1:
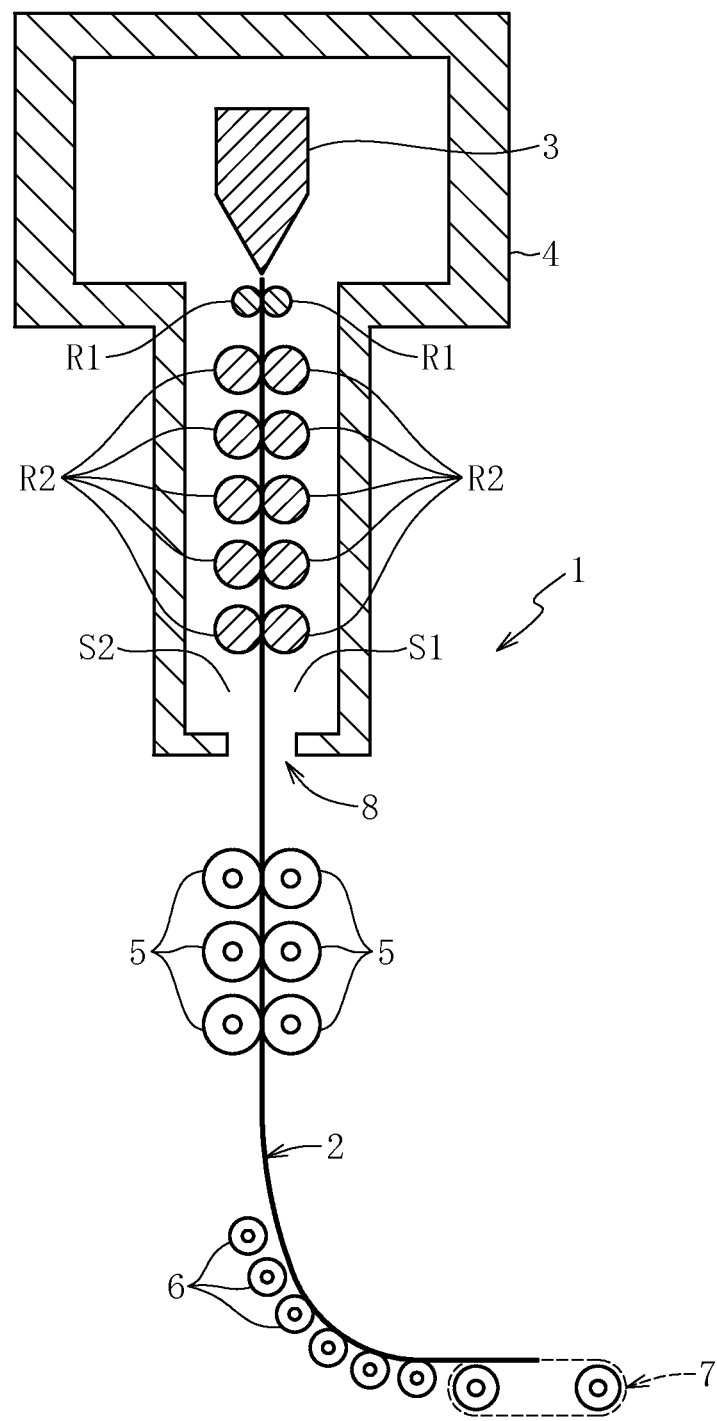
FIG. 1 is a side view illustrating an example of a practical situation of a method of manufacturing a band-shaped glass according to an embodiment of the present invention.

FIG. 1 is a side view illustrating an example of a practical situation of a method of manufacturing a band-shaped glass according to the embodiment of the present invention. As the method of manufacturing a band-shaped glass, an overflow downdraw method is employed in this embodiment, but other downdraw methods, for example, a slot downdraw method and a redraw method may be employed instead.

A manufacturing apparatus 1 to be used herein comprises, as main components thereof, a forming body 3 for forming a band-shaped glass 2, rollers R1, rollers R2, a surrounding wall 4 for surrounding the band-shaped glass 2 and the forming body 3, and rollers 5 and 6 and a conveyor 7 for supporting and conveying the band-shaped glass 2.

The forming body 3 forms the band-shaped glass 2 while being drawn downward from a lower end of the forming body 3. A pair of the rollers R1 to be brought into abutment against the band-shaped glass 2 from both surface sides thereof are arranged below the forming body 3. Further, on both the surface sides of the band-shaped glass 2, the pair of the rollers R1 are brought into abutment only against both edge portions of the band-shaped glass 2 in a width direction thereof. The rollers R1 have a function of suppressing contraction of the band-shaped glass 2 in the width direction while cooling the band-shaped glass 2.

Below the rollers R1, a plurality of pairs (in this embodiment, five pairs) of the rollers R2 to be brought into abutment against the band-shaped glass 2 from both the surface sides thereof are arranged along a vertical direction. Further, on both the surface sides of the band-shaped glass 2, the pairs of the rollers R2 are brought into abutment only against both the edge portions of the band-shaped glass 2 in the width direction. The rollers R2 have a function of drawing the band-shaped glass 2 downward.

The surrounding wall 4 surrounds the rollers R1, the rollers R2, the band-shaped glass 2, and the forming body 3. The surrounding wall 4 has an opening portion 8 at a lower end thereof, and the band-shaped glass 2 is conveyed to an exterior space through the opening portion 8. The surrounding wall 4 has substantially no other opening portion to the exterior space than the opening portion 8, and therefore has functions of, for example, retaining heat in the forming body 3 and annealing the band-shaped glass 2.

The interior space of the surrounding wall 4 is partitioned into a first space S1 and a second space S2 by the forming body 3 and the band-shaped glass 2 drawn downward from the forming body 3. In this embodiment, although illustration is omitted, there is provided temperature difference imparting means for imparting a temperature difference between the spaces S1 and S2 by adjusting temperatures of the first space S1 and the second space S2, respectively. The temperature difference imparting means imparts the temperature difference so that the temperature of the first space S1 becomes higher than the temperature of the second space S2 during the manufacture of the band-shaped glass 2. As described in detail later, the temperature difference thus imparted is utilized as glass curving means for curving the band-shaped glass 2.

Below the opening portion 8 of the surrounding wall 4, a plurality of pairs (in this embodiment, three pairs) of the rollers 5 to be brought into abutment against the band-shaped glass 2 from both the surface sides thereof are arranged along the vertical direction. Further, on both the surface sides of the band-shaped glass 2, the pair of the rollers 5 are brought into abutment only against both the edge portions of the band-shaped glass 2 in the width direction.

In a direction changing region located below the above-mentioned rollers 5, a plurality of (in this embodiment, six)

rollers 6 of another type are arranged into a substantially arc shape in side view, and are each brought into abutment against a lower surface of the band-shaped glass 2. Each of those rollers 6 may extend over the entire region of the band-shaped glass 2 in the width direction, or may be arranged at a part of the region in the width direction (at one or more positions).

The conveyor 7 is arranged laterally adjacent to one of those rollers 6 that is located at a downstream end, and the lower surface of the band-shaped glass 2 is brought into abutment against an upper surface of this conveyor 7. The conveyor 7 is constructed so that the width thereof is larger than the width of the band-shaped glass 2.

In the method of manufacturing the band-shaped glass through use of the manufacturing apparatus 1 having the above-mentioned structure, after the band-shaped glass 2 is formed while being drawn downward, the conveying direction of the band-shaped glass 2 is changed to the lateral direction so that the front surface of both surfaces of the band-shaped glass 2 constitutes the upper surface. The band-shaped glass 2 is introduced to the direction changing region under a curved state in which the front surface side thereof is concave in the width direction. This manufacturing method is described in detail below.

First, the band-shaped glass 2 is formed while being conveyed vertically downward from the lower end of the forming body 3. In this embodiment, the band-shaped glass 2 at this time is drawn downward by the rollers R2 while being cooled by the rollers R1 so as to suppress the contraction of the band-shaped glass 2 in the width direction. Thus, the thickness of the band-shaped glass 2 except both the edge portions in the width direction becomes 300 μm or less. At this time, the thickness of the band-shaped glass 2 at both the edge portions in the width direction is larger than the thickness of the above-mentioned portion, and both the edge portions in the width direction in this state are referred to as "selvage portions."

Then, the temperature difference imparting means imparts the temperature difference to the spaces S1 and S2 of the surrounding wall 4, and hence the temperature of the first space S1 is higher than the temperature of the second space S2. Thus, the ascending airflow becomes more significant in the first space S1 than in the second space S2, and accordingly the band-shaped glass 2 is brought into the curved state in which the front surface side thereof is concave in the width direction.

Figure 2:
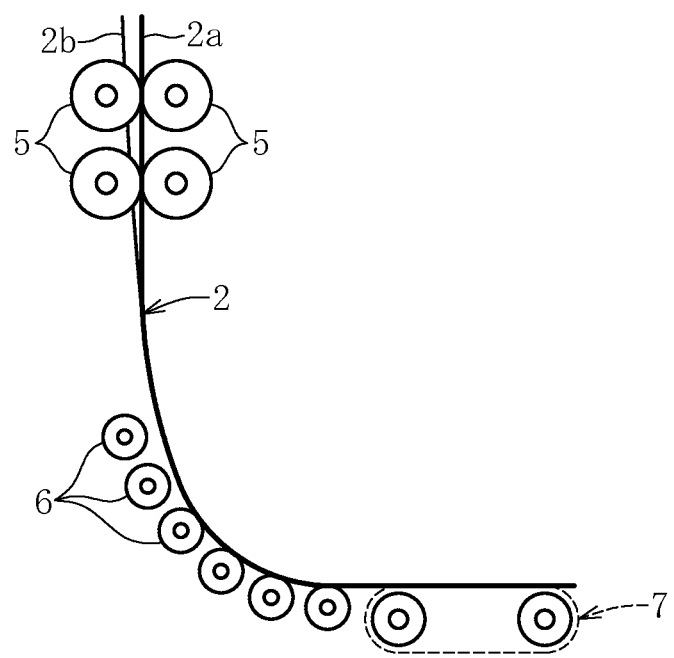
FIG. 2 is a side view illustrating a curved state of the band-shaped glass that is concave on a front surface side thereof.

As detailed in FIG. 2, the band-shaped glass 2 is conveyed in the downward direction through rotation of the rollers 5 while maintaining this curved state.

Then, the conveying direction of the band-shaped glass 2 is changed from the downward direction to the lateral direction through rotation of the rollers 6. That is, the above-mentioned direction changing region refers to a region in which those rollers 6 are arranged, and the band-shaped glass 2 is introduced to this region under the curved state. Note that, in FIG. 2, reference symbol 2a represents an edge of the band-shaped glass 2 in the width direction, and reference symbol 2b represents a vertex of the curve of the band-shaped glass 2 (the same applies to the figures referred to later).

Then, the band-shaped glass 2 is conveyed in the lateral direction through revolving motion of the conveyor 7 (in this embodiment, along a horizontal direction).

The above-mentioned operation is continued, and thus the band-shaped glass 2 is manufactured successively.

Figure 3:
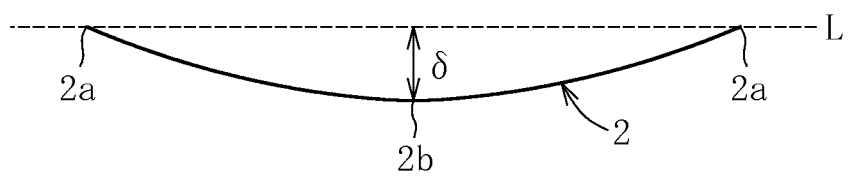
FIG. 3 is a plan view illustrating the curved state of the band-shaped glass that is concave on the front surface side thereof.

In the present invention, as illustrated in FIG. 3, the above-mentioned curved state of the band-shaped glass 2 is represented by a maximum separation distance $\delta$ of the band-shaped glass 2 with respect to an imaginary straight line L connecting both the edge portions of the band-shaped glass 2 in the width direction, which is brought into the curved state (distance from the imaginary straight line L to the vertex 2b of the curve). The maximum separation distance $\delta$ is positive on the front surface side of the band-shaped glass 2 (upper side in FIG. 3). This maximum separation distance $\delta$ satisfies a relationship of $0 > \delta \geq -200$ mm. This relationship is preferably $0 > \delta \geq -100$ mm, more preferably $0 > \delta \geq -50$ mm. The value of this maximum separation distance $\delta$ can be adjusted through adjustment of the temperature difference of the spaces S1 and S2 of the surrounding wall 4. In the present invention, it is assumed that the maximum separation distance $\delta$ is measured at a portion below the lowermost roller R2.

In the above-mentioned method of manufacturing a band-shaped glass according to the embodiment of the present invention, the following effects can be attained.

Figure 4:
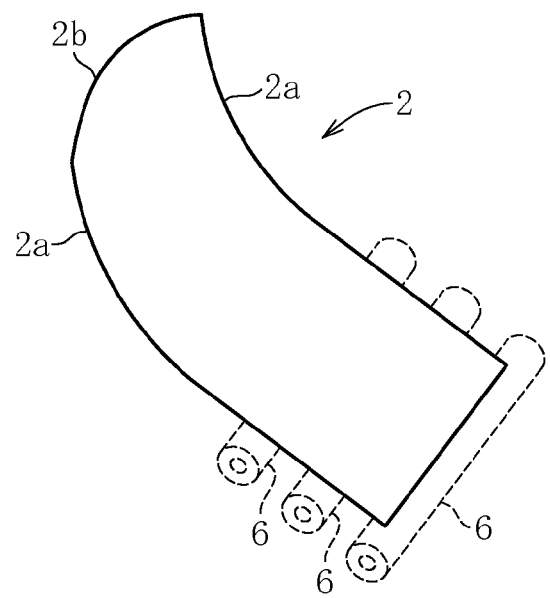
FIG. 4 is a perspective view illustrating how the band-shaped glass in the curved state that is concave on the front surface side thereof is introduced to a direction changing region.

The band-shaped glass 2 is introduced to the region of the rollers 6 for changing the direction under the curved state in which the front surface side thereof is concave in the width direction while satisfying the relationship of $0 > \delta \geq -200$ mm. That is, when the band-shaped glass 2 is to be introduced to the direction changing region, the band-shaped glass 2 is intendedly brought into the curved shape in which the front surface side thereof is concave in the width direction. Therefore, the band-shaped glass 2 is brought into a stable state, and has an appropriate curvature. Thus, as illustrated in FIG. 4, the direction is changed without any application of unreasonable stress to the band-shaped glass 2, and hence the band-shaped glass 2 can be bent easily for the change in direction. Accordingly, the damage to the band-shaped glass 2 can be suppressed.

Figure 5:
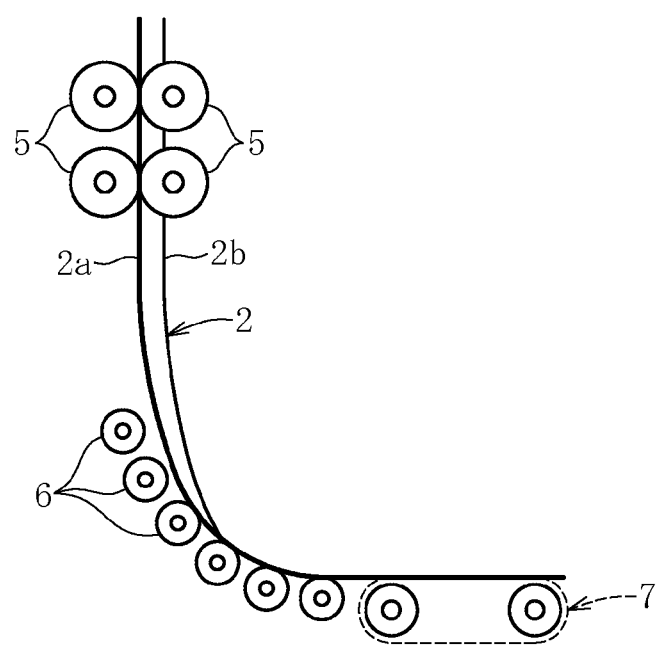
FIG. 5 is a side view illustrating a curved state of the band-shaped glass that is convex on the front surface side thereof.
Figure 6:
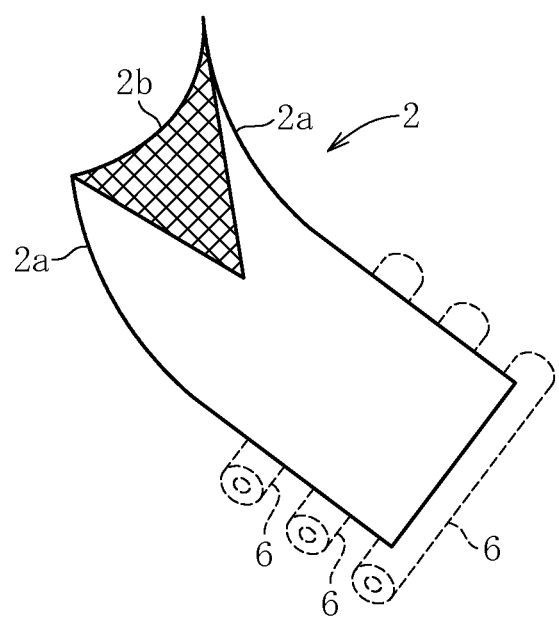
FIG. 6 is a perspective view illustrating how the band-shaped glass in the curved state that is convex on the front surface side thereof is introduced to the direction changing region.

When the maximum separation distance $\delta$ is larger than 0 mm (the band-shaped glass 2 is brought into a curved state in which the front surface side thereof is convex in the width direction), on the other hand, the following situation may occur. As illustrated in FIG. 5, when the conveying direction of the band-shaped glass 2 is to be changed to the lateral direction, the curved state is maintained also in the region of the rollers 6 for changing the direction. Then, the band-shaped glass 2 in this region has a shape like a beak with a stress concentration portion indicated by cross hatching in FIG. 6, and the band-shaped glass 2 may be damaged due to this shape.

Note that, when the maximum separation distance $\delta$ is 0, the band-shaped glass 2 is in a non-curved state. This state is already described above, and description thereof is therefore omitted herein.

Further, when the maximum separation distance $\delta$ is smaller than $-200$ mm, the amount of curve of the band-shaped glass 2 is extremely large, and hence unreasonable stress concentration may occur when the band-shaped glass 2 is to be bent for the change in direction, with the result that the band-shaped glass 2 may be damaged.

The glass curving means may be implemented not only by utilizing the above-mentioned temperature difference, but also by utilizing an electric field to be generated around the band-shaped glass 2, by utilizing an inclined forming body 3, by utilizing a forming body 3 having a curved lower end portion, and further by utilizing an air pressure. It is preferred, however, that the above-mentioned temperature difference be utilized in consideration of cost and workability.

The position for curving the band-shaped glass 2 so that the front surface side thereof is concave may be a position during annealing (before solidification), or may be a position after the solidification. However, the position after the solidification is preferred from the viewpoint of reducing a risk in that an adverse effect (warp, internal stress, or the like) due to the curve of the band-shaped glass 2 remains after the manufacture.

In the method of manufacturing the band-shaped glass 2 by the downdraw method as illustrated in FIG. 1, the curving direction of the band-shaped glass 2 may be reversed at a plurality of positions in the process of manufacturing the band-shaped glass 2. Even in this case, the effects of the present invention can be attained through control of the maximum separation distance δ in all the curved portions. The present invention is intended to suppress damage to the band-shaped glass 2 in the region for changing the direction, and hence it is preferred to control the maximum separation distance δ in the vicinity of the opening portion 8 of the surrounding wall 4 that may affect the band-shaped glass 2 in the region for changing the direction.

The downdraw method to be used in the manufacturing method of the present invention is not particularly limited, but it is preferred to employ the overflow downdraw method as in the above-mentioned embodiment because a band-shaped glass having excellent surface quality can be manufactured even without carrying out polishing. The reason why the band-shaped glass having excellent surface quality can be manufactured is because the surface of the band-shaped glass that corresponds to the front surface is not brought into contact with an object other than air, and is formed in a state of a free surface.

The overflow downdraw method herein refers to a method of manufacturing a band-shaped glass by causing molten glass to overflow from both sides of a trough-shaped structure that is a heat-resistant forming body, converging the streams of overflowed molten glass at a lower end of the trough-shaped structure, and by drawing the molten glass downward in this state. The construction and the material of the trough-shaped structure are not particularly limited as long as the dimensions and the surface accuracy of the band-shaped glass meet the quality required for intended use. Further, when drawing the molten glass downward, any method may be employed so as to apply a force to the band-shaped glass. For example, there may be employed a method of drawing the band-shaped glass by rotating a heat-resistant roller having a sufficient width under a state in which the roller is brought into contact with the band-shaped glass. Alternatively, there may be employed a method of drawing the band-shaped glass by bringing a plurality of pairs of heat-resistant rollers into contact with only the vicinity of edge surfaces of the band-shaped glass in the width direction.

As a matter of course, in the manufacturing method of the present invention, there may be employed a downdraw method other than the overflow downdraw method, for example, a slot downdraw method and a redraw method.

By the way, as the glass becomes thinner, the amount of heat kept in the glass itself becomes smaller, and hence, in the downdraw method, the glass is liable to be cooled during a period in which the glass sheet is being drawn, in other words, the viscosity is liable to be raised. In particular, in a case of forming a band-shaped glass having a final thickness of 100 μm or less, the glass separated from the forming equipment (in the case of the overflow downdraw method, the forming body) contracts in the width direction due to surface tension, and at the same time, the viscosity is significantly raised due to abrupt temperature drop.

Therefore, to secure a necessary width and a desired thickness, for example, in the overflow downdraw method, it is preferred to control the temperature by means of heating, heat retention, or the like so that the viscosity of the glass immediately after being drawn from the forming body becomes $10^{5.0}$ dPa·s or less, particularly $10^{4.8}$ dPa·s or less, $10^{4.6}$ dPa·s or less, $10^{4.4}$ dPa·s or less, $10^{4.2}$ dPa·s or less, or $10^{4.0}$ dPa·s or less. Through the temperature control described above, the width can be increased without damage even when a tensile stress is applied in the width direction of the band-shaped glass. Further, the band-shaped glass can easily be drawn downward.

On the other hand, an extremely low viscosity of the glass is not preferred because the band-shaped glass is liable to deform and becomes warped or wavy, thus leading to degradation in quality. Further, the extremely low viscosity of the glass is not preferred because the temperature of the glass to be drawn is raised and then the glass is cooled at a higher rate, thus leading to a risk in that the thermal contraction of the glass becomes significant. Thus, it is preferred that the viscosity of the glass be $10^{3.5}$ dPa·s or more, $10^{3.7}$ dPa·s or more, $10^{3.8}$ dPa·s or more, or $10^{3.9}$ dPa·s or more.

The method of manufacturing a band-shaped glass according to the present invention comprises a step of annealing the band-shaped glass. During the annealing, a higher cooling rate of the glass is not preferred because the coefficient of thermal contraction becomes higher. On the other hand, an extremely low cooling rate is not preferred because the productivity is degraded or the annealing area becomes unreasonably long in the manufacturing process. To efficiently reduce the coefficient of thermal contraction, it is preferred that an average cooling rate within a temperature range in a case where the viscosity of the glass is $10^{10}$ to $10^{14.5}$ dPa·s, particularly $10^{11}$ to $10^{14}$ dPa·s, further $10^{12}$ to $10^{14}$ dPa·s be set to 100° C./min or less, more particularly 80° C./min or less, 50° C./min or less, 30° C./min or less, or 20° C./min or less. Further, it is preferred that the average cooling rate be 1° C./min or more, 2° C./min or more, 5° C./min or more, or 10° C./min or more. Note that, the "average cooling rate" is herein determined by dividing the temperature range corresponding to the above-mentioned viscosity range of the glass by a time period required for the passage of the glass.

In the present invention, the movement direction of the band-shaped glass may be changed from the downward direction to the lateral direction during the annealing. When the direction of the band-shaped glass is changed during the annealing, a sufficient time period and distance required to achieve a desired coefficient of thermal contraction can be utilized for the annealing. That is, there is no height restriction that is a problem peculiar to the case where the downdraw method is employed.

To change the direction of the band-shaped glass, which is moving downward, to the substantially lateral direction, various methods may be employed. For example, there may be employed a method of changing the direction by conveying the band-shaped glass along a roller conveyor comprising a large number of rollers, and a method of changing the direction by guiding both the edge portions of the band-shaped glass in the width direction alone through use of an air conveyor. Alternatively, the direction may be changed by bending the band-shaped glass in a free state instead of guiding the band-shaped glass through use of the roller and the like.

The curvature radius of the band-shaped glass that is required to change the direction only needs to be adjusted in accordance with the thickness. That is, the curvature radius needs to be further increased as the thickness is larger, and conversely, the curvature radius may further be decreased as the thickness is smaller.

It is preferred that the method of manufacturing a band-shaped glass according to the present invention comprise a step of cutting the band-shaped glass, which has undergone the annealing, into a predetermined length. The cutting herein comprises not only cutting of the band-shaped glass into a length suitable for end use, but in a case where a rolling step described later is employed, also comprises cutting of the band-shaped glass for separation along with replacement of the roll. Note that, to cut the band-shaped glass, various methods may be employed, such as a method of snapping the band-shaped glass after forming a scribe line with a cutter or laser light in advance, and a method of fusing the band-shaped glass with laser light.

The method of manufacturing a band-shaped glass according to the present invention may further comprise a step of cutting the band-shaped glass after the band-shaped glass is rolled into a roll shape. In this case, it is desired to roll the band-shaped glass together with interleaving paper for the purpose of preventing a flaw that may be generated when portions of the band-shaped glass are brought into contact with each other, and absorbing an external pressure that may be applied to the roll. Note that, it is preferred that the minimum curvature radius of the band-shaped glass to be rolled, for example, in a case of the band-shaped glass having a thickness of 100 μm be 200 mm or less, particularly 150 mm or less, 100 mm or less, 70 mm or less, 50 mm or less, or more particularly 30 mm or less. When the curvature radius is set smaller, the efficiency of packaging and transportation is enhanced.

In addition to the above-mentioned steps, the method may comprise various steps as necessary. For example, the method may comprise an edge portion separating step of separating the edge portions of the band-shaped glass in the width direction (so-called selvage portions) after the annealing is completed. In this step, there may suitably be employed a method of successively cutting and separating the edge portions of the glass through, for example, laser cleaving for cutting the glass due to a thermal stress generated by cooling the glass after irradiation with laser light, laser fusing for melting and cutting the glass due to energy of laser light, or alternatively a method of modifying and cutting the glass by irradiating the glass with short-pulse laser light. As the laser to be used in this case, a carbon dioxide laser, a YAG laser, and the like may be used.

Note that, it is preferred that laser power to be output in the laser cleaving be adjusted to match the speed of propagation of the crack due to the laser with the drawing speed of the glass. It is preferred that the value of (speed ratio)=((speed of propagation of crack due to laser)−(drawing speed))/(drawing speed)×100 be ±10% or less, ±5% or less, ±1% or less, ±0.5% or less, or ±0.1% or less.

Further, there may be employed a polishing step of polishing the surface of the band-shaped glass. In the case where the overflow downdraw method is employed, however, the surface of the glass is a forged surface, and hence the surface quality is significantly high, with the result that the polishing step becomes unnecessary. Further, it is preferred that the band-shaped glass be put to use in an unpolished state because the mechanical strength of the glass becomes higher. That is, the theoretical strength of the glass is significantly high fundamentally. However, the glass is broken in many cases even due to a stress yet smaller than the theoretical strength. The reason therefor is because a small defect called "Griffith flaw" is generated in the surface of the glass due to the step subsequent to the glass forming, for example, the polishing step.

It is preferred that the width of the band-shaped glass to be obtained by the method of manufacturing a band-shaped glass according to the present invention be 500 mm or more. In an OLED display or the like, so-called multi-panel manufacture is carried out, which involves collectively forming TFTs and then cutting out each panel. Therefore, as the width of the band-shaped glass is larger, the cost can further be reduced for each panel. The width of the band-shaped glass is preferably 600 mm or more, 800 mm or more, 1,000 mm or more, 1,200 mm or more, 1,500 mm or more, or 2,000 mm or more.

When the width of the band-shaped glass exceeds 3,500 mm, on the other hand, it becomes difficult to secure the thickness and the surface quality in the width direction, and hence it is preferred that the width of the band-shaped glass be 3,500 mm or less, 3,200 mm or less, or 3,000 mm or less. Note that, the width of the band-shaped glass may be adjusted by the size and shape of the forming body, the position of an edge roller, and the like. Note that, the edge roller refers to a roller installed in the uppermost stage and configured to control the width by applying a tensile force in the width direction while cooling the band-shaped glass flowing downward from the forming body.

Further, it is preferred that the thickness of the band-shaped glass to be obtained be 300 μm or less, particularly 200 μm or less, 100 μm or less, or 50 μm or less. As the thickness of the band-shaped glass is smaller, the device can further be lightweighted. Further, the value of the stress that may be generated when the glass is curved is decreased, and hence the curvature radius of the band-shaped glass that is required to change the direction can be decreased. The same applies to the case where the band-shaped glass is rolled into a roll shape. Further, in the case where the laser cutting is employed for separating the edge portions, the power necessary therefor can be saved. Alternatively, when the power is constant, the cutting can be carried out at higher speed. When the thickness is smaller than 1 μm, however, the mechanical strength of the glass cannot be maintained. Further, the band-shaped glass is deformed due to a subtle airflow during the glass forming, and is solidified as it is to cause warp or the like, which may result in an adverse effect on the quality. Thus, in a case where the strength and the quality are to be enhanced, it is preferred that the thickness be 1 μm or more, 5 μm or more, 10 μm or more, 30 μm or more, 50 μm or more, or 60 μm or more. The thickness of the band-shaped glass may be adjusted by the flow rate of the glass and the drawing speed.

Further, it is preferred that the difference between the maximum thickness and the minimum thickness of the band-shaped glass to be obtained be 20 μm or less, particularly 10 μm or less, 5 μm or less, 2 μm or less, or 1 μm or less. When such a thickness deviation occurs over a given width at a predetermined portion in the downdraw method, and when this difference becomes larger, there is formed such a portion that the curvature radius slightly differs at only a part of the band-shaped glass during the rolling. This phenomenon is not preferred because, as the rolling amount becomes larger, there is a higher risk of damage to the band-shaped glass due to a stress that may be generated by the thickness difference. Note that, the thickness difference (thickness deviation) between the maximum thickness and the minimum thickness of the band-shaped glass may be adjusted by the temperature inside the annealing furnace.

Further, it is preferred that the average surface roughness Ra of the band-shaped glass to be obtained be 100 Å or less. In particular, it is desired that the average surface roughness Ra be 50 Å or less, 10 Å or less, 8 Å or less, 4 Å or less, 3 Å or less, or 2 Å or less. When the average surface roughness Ra of the band-shaped glass is more than 100 Å, the display characteristics of an OLED device are degraded in some cases. Note that, the Ra herein refers to an Rmax of the band-shaped glass on the contact surface side, which is measured under the conditions of a scan size of 10 μm, a scan rate of 1 Hz, and a sample line of 512 through the use of an AFM (Nanoscope III a) manufactured by Veeco. The measurement of the Rmax was performed in conformity with JIS B 0601-1982.

On the other hand, when the Ra is small, glass-interleaving paper and glass-glass are continuously peeled off in the unrolling of glass, with the result that glass surfaces may be charged. The occurrence of such charging may cause problems such as the occurrence of charging breakdown in a subsequent step and the attraction of fine particles in an atmosphere onto the surfaces of the band-shaped glass. In a use or step in which importance is given to such charging, it is preferred that the Ra be set to 0.5 Å or more, 1 Å or more, 2 Å or more, 3 Å or more, 5 Å or more, or 10 Å or more through the use of atmospheric pressure plasma treatment or the like. The average surface roughness Ra in the case of using the atmospheric pressure plasma treatment may be adjusted by, for example, the concentration of a source gas ($CF_4$ or $SF_4$).

Further, it is preferred that the waviness of the band-shaped glass to be obtained be 1 μm or less. In particular, it is desired that the waviness be 0.08 μm or less, 0.05 μm or less, 0.03 μm or less, 0.02 μm or less, or 0.01 μm or less. When the waviness of the band-shaped glass is large, the display characteristics of an OLED device are degraded in some cases. The waviness of the band-shaped glass may be adjusted by, for example, the height and rotation number of a stirrer for stirring or the temperature of a forming body. Note that, the waviness herein refers to a value for Wcc, which is measured based on the specification of JIS B 0601-1982 through the use of SURFCOM 750A manufactured by TOKYO SEIMITSU CO., LTD.

Further, it is preferred that the band-shaped glass to be obtained have a coefficient of thermal contraction, when the temperature is increased from normal temperature at a rate of 10° C./min, kept at 500° C. for 1 hour, and decreased to normal temperature at a rate of 10° C./min, of 200 ppm or less, particularly 150 ppm or less, 100 ppm or less, 80 ppm or less, 60 ppm or less, 50 ppm or less, 45 ppm or less, 40 ppm or less, 30 ppm or less, 20 ppm or less, or 10 ppm or less. A case where the coefficient of thermal contraction is more than 200 ppm is not preferred because display defects such as a pitch deviation may occur in a thermal step of forming pixels in an OLED display. Note that, the coefficient of thermal contraction of the band-shaped glass may be reduced by optimizing annealing conditions (such as an annealing rate, an annealing time, and an annealing temperature range).

Further, it is preferred that the surface roughness Ra of the edge surfaces of the band-shaped glass to be obtained be 100 Å or less, particularly 80 Å or less, 50 Å or less, 20 Å or less, 10 Å or less, 8 Å or less, or 6 Å or less. A surface roughness Ra of more than 100 Å is not preferred because it is highly probable that the glass is broken from the edge surfaces. Note that, the surface roughness Ra of the edge surfaces of the band-shaped glass may be adjusted by laser power or cutting speed in the case of laser cutting.

Further, it is preferred that glass constituting the band-shaped glass to be obtained have a liquidus temperature of 1,200° C. or less, 1,150° C. or less, 1,130° C. or less, 1,110° C. or less, or 1,090° C. or less, particularly 1,070° C. or less, and it is desired that the glass have a viscosity at the liquidus temperature of $10^{5.0}$ dPa·s or more, $10^{5.6}$ dPa·s or more, or $10^{5.8}$ dPa·s or more, particularly $10^{6.0}$ dPa·s or more, in order to prevent the glass from being devitrified during forming when the glass is formed by employing an overflow down-draw method.

Further, it is desired that the glass constituting the band-shaped glass have a Young's modulus of 65 GPa or more, 67 GPa or more, 68 GPa or more, or 69 GPa or more, optimally 70 GPa or more.

Further, it is desired that the glass constituting the band-shaped glass have as low a density as possible in order to achieve the light-weighting of a device. Specifically, it is desired that the density be 2.7 g/cm$^3$ or less, 2.6 g/cm$^3$ or less, or 2.5 g/cm$^3$ or less, particularly 2.4 g/cm$^3$ or less.

Further, it is desired that the glass constituting the band-shaped glass have a coefficient of thermal expansion in the temperature range of 30 to 380° C. of 25 to 100×10$^{-7}$/° C., 30 to 90×10$^{-7}$/° C., 30 to 60×10$^{-7}$/° C., 30 to 45×10$^{-7}$/° C., or 30 to 40×10$^{-7}$/° C. so that the coefficient of thermal expansion is matched with those of various films to be formed on the band-shaped glass in the manufacture of a device.

Further, it is desired that the glass constituting the band-shaped glass have a strain point, which is an indicator of heat resistance of glass, of 600° C. or more, particularly 630° C. or more.

The glass satisfying the various characteristics described above can be produced, for example, in the composition range of, in terms of weight percentage, 40 to 80% of $SiO_2$, 0 to 20% of $Al_2O_3$, 0 to 17% of $B_2O_3$, 0 to 10% of MgO, 0 to 15% of CaO, 0 to 15% of SrO, and 0 to 30% of BaO. The reasons why the composition range has been determined as described above are described below.

The content of $SiO_2$ is 40 to 80%. When the content of $SiO_2$ becomes high, it becomes difficult to melt and form glass. Accordingly, it is desired that the content of $SiO_2$ be 75% or less, preferably 64% or less or 62% or less, particularly 61% or less. On the other hand, when the content of $SiO_2$ becomes low, it becomes difficult to form a glass network structure, thus leading to difficulty in vitrification, and an increase in crack occurrence ratio and degradation in acid resistance occur. Accordingly, it is desired that the content of $SiO_2$ be 50% or more, preferably 55% or more, particularly 57% or more.

The content of $Al_2O_3$ is 0 to 20%. When the content of $Al_2O_3$ becomes high, devitrified crystals are liable to be precipitated in glass and a reduction in liquidus viscosity occurs. Accordingly, it is desired that the content of $Al_2O_3$ be 20% or less, preferably 18% or less or 17.5% or less, particularly 17% or less. On the other hand, when the content of $Al_2O_3$ becomes low, a reduction in strain point of glass and a reduction in its Young's modulus occur. Accordingly, it is desired that the content of $Al_2O_3$ be 3% or more, preferably 5% or more, 8.5% or more, 10% or more, 12% or more, 13% or more, 13.5% or more, or 14% or more, particularly 14.5% or more.

The content of $B_2O_3$ is 0 to 17%. When the content of $B_2O_3$ becomes high, a reduction in strain point, a reduction in Young's modulus, and degradation in acid resistance occur. Accordingly, it is desired that the content of $B_2O_3$ be 17% or less, preferably 15% or less, 13% or less, 12% or less, or 11% or less, particularly 10.4% or less. On the other hand, when the content of $B_2O_3$ becomes low, an increase in viscosity at high temperature, degradation in meltability, an increase in crack occurrence ratio, an increase in liquidus temperature, and an increase in density occur. Accordingly, it is desired that the content of $B_2O_3$ be 2% or more, preferably 3% or more, 4% or more, 5% or more, 7% or more, 8.5% or more, or 8.8% or more, particularly 9% or more.

The content of MgO is 0 to 10%. MgO is a component that increases the Young's modulus and strain point of glass and reduces its viscosity at high temperature, and has an effect of lowering a crack occurrence ratio. However, when the content of MgO becomes high, an increase in liquidus temperature, a reduction in denitrification resistance, and degradation in BHF resistance occur. Accordingly, it is desired that the content of MgO be set to 10% or less, 5% or less, 3% or less, 2% or less, 1.5% or less, 1% or less, or 0.5% or less.

The content of CaO is 0 to 15%. When the content of CaO becomes high, increases in density and coefficient of thermal expansion occur. Accordingly, it is desired that the content of CaO be 15% or less, preferably 12% or less, 10% or less, 9% or less, or 8.5% or less. On the other hand, when the content of CaO becomes low, degradation in meltability and a reduction in Young's modulus occur. Accordingly, it is desired that the content of CaO be preferably 2% or more, 3% or more, 5% or more, 6% or more, or 7% or more, particularly 7.5% or more.

The content of SrO is 0 to 15%. When the content of SrO becomes high, increases in density and coefficient of thermal expansion occur. Accordingly, it is desired that the content of SrO be 15% or less, preferably 12% or less, 10% or less, 6% or less, or 5% or less, particularly 4.5% or less. On the other hand, when the content of SrO becomes low, degradation in meltability or chemical resistance occur. Accordingly, it is desired that the content of SrO be preferably 0.5% or more, 1% or more, 2% or more, or 3% or more, particularly 3.5% or more.

The content of BaO is 0 to 30%. When the content of BaO becomes high, increases in density and coefficient of thermal expansion occur. Accordingly, it is desired that the content of BaO be 30% or less, preferably 25% or less, 20% or less, 15% or less, 10% or less, 5% or less, 2% or less, or 1% or less, particularly 0.5% or less.

When the components MgO, CaO, SrO, and BaO are mixed and incorporated, the liquidus temperature of glass remarkably reduces and crystalline foreign materials are hardly produced in glass. Thus, effects of improving the meltability and formability of glass are obtained. Therefore, when the total content of the components becomes low, the function as a melting accelerate component becomes insufficient, leading to degradation in meltability. Accordingly, it is desired that the total content be 5% or more, 8% or more, 9% or more, or 11% or more, particularly 13% or more. On the other hand, when the total content of the components MgO, CaO, SrO, and BaO becomes high, an increase in density occurs, it becomes impossible to achieve the light-weighting of glass, and an increase in crack occurrence ratio tends to occur. Accordingly, it is desired that the total content be 30% or less, 20% or less, or 18% or less, particularly 15% or less. Further, particularly when a reduction in density of glass is to be achieved, it is desired that the lower limit of the total content be set to 5% or more or 8% or more and the upper limit thereof be set to 13% or less, 11% or less, or 10% or less.

ZnO is a component that improves meltability and increases a Young's modulus. However, a high content of ZnO is not preferred because glass is liable to be devitrified and a reduction in strain point and an increase in density occur. Accordingly, it is preferred that the content of ZnO be 15% or less, 10% or less, 5% or less, 3% or less, or 1% or less, particularly 0.5% or less.

$ZrO_2$ is a component that increases a Young's modulus. However, a content of $ZrO_2$ of more than 5% is not preferred because an increase in liquidus temperature occurs and devitrified foreign matter of zircon is liable to be produced. The content of $ZrO_2$ falls within the range of preferably 3% or less, more preferably 1% or less, still more preferably 0.5% or less, most preferably 0.1% or less.

Further, in addition to the above-mentioned components, in the present invention, $Y_2O_3$, $Nb_2O_3$, or $La_2O_3$ may be incorporated at up to about 5%. Those components have functions of increasing a strain point, a Young's modulus, and the like. However, a high content of $Y_2O_3$, $Nb_2O_3$, or $La_2O_3$ is not preferred because an increase in density occurs.

In addition, in the above-mentioned glass, one kind or two or more kinds selected from the group consisting of $As_2O_3$, $Sb_2O_3$, $CeO_2$, $SnO_2$, F, Cl, and $SO_3$ may be used as a fining agent at 0 to 3%. In this regard, however, the use of $As_2O_3$, $Sb_2O_3$, and F, particularly $As_2O_3$ and $Sb_2O_3$ should be restricted as much as possible from an environmental viewpoint, and the content of each of the components should be limited to less than 0.1%. Accordingly, $SnO_2$, $SO_3$, and Cl are preferably used as the fining agent. It is preferred that the content of $SnO_2$ be 0 to 1% or 0.01 to 0.5%, particularly 0.05 to 0.4%. Further, the total content of $SnO_2+Cl+SO_3$ is 0.001 to 1%, 0.01 to 0.5%, or 0.01 to 0.3%.

EXAMPLE 1

The inventors of the present invention evaluated a method of manufacturing a band-shaped glass according to Example of the present invention. The glass according to this example is an alkali-free glass, and comprises, as a composition in terms of mass percentage, 60% of $SiO_2$, 16% of $Al_2O_3$, 10% of $B_2O_3$, 0.3% of MgO, 8% of CaO, 5% of SrO, 0.5% of BaO, and 0.2% of $SnO_2$. The glass had a liquidus temperature of 1,070° C., a Young's modulus of 73 GPa, a density of 2.45 g/cm$^3$, a strain point of 650° C., and a coefficient of thermal expansion of $38 \times 10^{-7}$/° C. (30 to 380° C.). Note that, the "alkali-free glass" refers to a glass in which the content of an alkali metal oxide in its glass composition is less than 1,000 ppm.

Through use of the glass raw material having the above-mentioned composition, the glass was drawn downward at about 600 cm/min by the overflow downdraw method, to thereby form a band-shaped glass having a width of 1,600 mm and an average thickness of 100 μm. Under a state in which this band-shaped glass was curved through adjustment of the temperature in the interior space of the surrounding wall, the band-shaped glass was introduced to the region for changing the direction, and the conveying direction of the band-shaped glass was changed from the downward direction to the horizontal direction. In this manner, the band-shaped glass was manufactured successively.

Through the adjustment of the temperature in the interior space of the surrounding wall, the curved state (maximum separation distance δ) was changed. Table 1 shows evaluation results for the respective curved states. The symbols in the evaluation shown in Table 1 represent the following details.
⊚: no damage to glass with less warp
○: no damage to glass
Δ: no damage to glass with shape having stress concentration portion
x: damage occurring in glass

TABLE 1

| | Maximum separation distance δ [mm] | | | | | | | | | | |
|---|---|---|---|---|---|---|---|---|---|---|---|
| | 300 | 200 | 100 | 50 | −25 | −50 | −100 | −150 | −200 | −250 | −300 |
| Evaluation | X | X | Δ | Δ | ⊚ | ⊚ | ◯ | ◯ | ◯ | X | X |

When the maximum separation distance δ was −250 mm or less, the band-shaped glass was curved excessively so that the band-shaped glass was not bent easily, resulting in damage to the glass. When 0>δ≥−200 mm, the direction of the band-shaped glass was changed to the horizontal direction without causing damage to the glass. In particular, when 0>δ≥−50 mm, the band-shaped glass was manufactured with less warp occurring after cooling. When δ>0 mm, the shape having a stress concentration portion (beak shape) was formed, and the glass was damaged shortly when any external force was applied thereto. Further, even when the thickness is small (for example, 30 μm), the glass may be damaged. When δ≥200 mm, the glass was damaged at a point starting from the stress concentration portion.

As described above, it was confirmed that, when 0>δ≥−200 mm, particularly when 0>δ≥−50 mm, the band-shaped glass was manufactured satisfactorily.

REFERENCE SIGNS LIST 1 manufacturing apparatus
2 band-shaped glass
3 forming body
4 surrounding wall
5 roller
6 roller (direction changing region)
L imaginary straight line
δ maximum separation distance

The invention claimed is:

1. A method of manufacturing a band-shaped glass, comprising:
    forming, while drawing downward, a band-shaped glass having a plurality of surfaces, a plurality of edge portions, and a thickness of 300 μm or less except at the plurality of edge portions in a width direction of the band-shaped glass; and
    then changing a conveying direction of the band-shaped glass to a lateral direction so that a front surface of the band-shaped glass constitutes an upper surface,
    the band-shaped glass being introduced to a region for changing the conveying direction under a curved state in which a front surface side of the band-shaped glass is concave in the width direction, and
    the band-shaped glass in the curved state satisfying a relationship of 0>δ≥−200 mm, where δ represents a maximum separation distance with respect to an imaginary straight line connecting the plurality of edge portions of the band-shaped glass in the width direction, provided that the maximum separation distance is positive on the front surface side of the band-shaped glass.

2. The method of manufacturing a band-shaped glass according to claim 1, wherein the band-shaped glass in the curved state satisfies a relationship of 0>δ≥−100 mm.

3. The method of manufacturing a band-shaped glass according to claim 2, further comprising imparting, during the forming of the band-shaped glass, a temperature difference between the plurality of surfaces of the band-shaped glass to bring the band-shaped glass into the curved state.

4. The method of manufacturing a band-shaped glass according to claim 1, wherein the band-shaped glass in the curved state satisfies a relationship of 0>δ≥−50 mm.

5. The method of manufacturing a band-shaped glass according to claim 4, further comprising imparting, during the forming of the band-shaped glass, a temperature difference between the plurality of surfaces of the band-shaped glass to bring the band-shaped glass into the curved state.

6. The method of manufacturing a band-shaped glass according to claim 1, further comprising imparting, during the forming of the band-shaped glass, a temperature difference between the plurality of surfaces of the band-shaped glass to bring the band-shaped glass into the curved state.

* * * * *